Feb. 25, 1930.  C. A. SWINEHART  1,748,740
INTERLOCKING DEVICE
Filed July 20, 1928
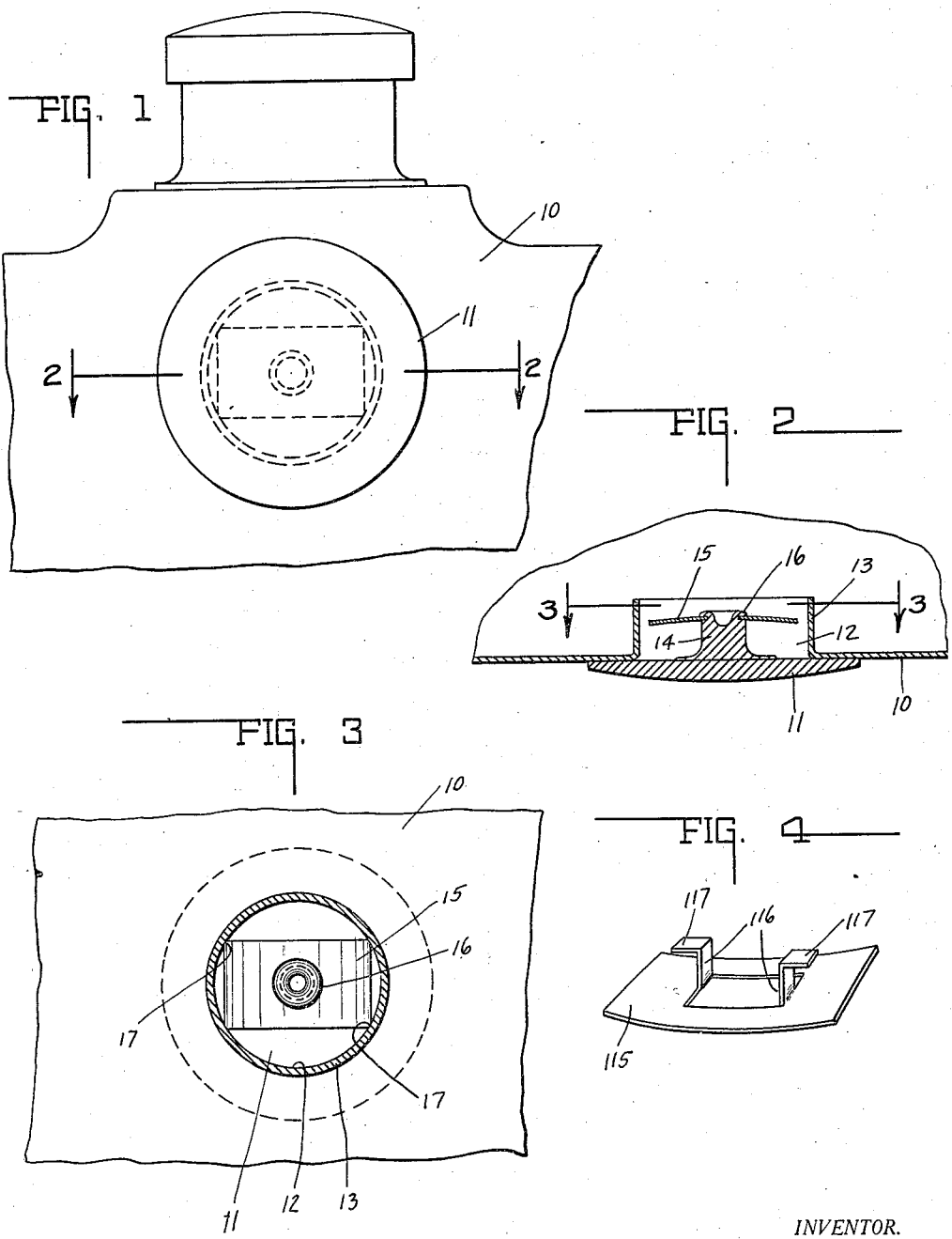
INVENTOR.
CLARK A. SWINEHART.
BY
ATTORNEYS.

Patented Feb. 25, 1930

1,748,740

UNITED STATES PATENT OFFICE

CLARK A. SWINEHART, OF INDIANAPOLIS, INDIANA

INTERLOCKING DEVICE

Application filed July 20, 1928. Serial No. 294,205.

This invention pertains to an interlocking device for securing two members together, and particularly the name plate of a vehicle to the radiator shell.

The principal object of the invention resides in the arrangement of a very simple means for firmly securing the name plate or similar device in position without exposure thereof, by means of a single flexible metal strip adapted to flex into position in such fashion that the corners thereof will engage the annular inner surface of the member to which the plate is secured so as to not only center the plate and retain it in position, but prevent rotation thereof.

The full nature of the invention will be understood from the accompanying drawings and the following description and claims:

In the drawings, Figure 1 is a front elevation showing a name plate secured to the vehicle. Fig. 2 is a section taken on the line 2—2 of Fig. 1. Fig. 3 is a section taken on the line 3—3 of Fig. 2. Fig. 4 is a modified form of the securing member.

In the drawings there is shown the front of a radiator shell 10 having a name plate 11 secured in place thereon. The shell is provided with an annular opening 12 surrounded by the annular inwardly-extending wall 13. Rigidly secured to the name plate 11 by any suitable means, such as soldering or welding, there is a rearwardly-extending stem 14 having secured on the free end thereof in spaced relation to the name plate, a retaining or gripping member 15. Said member may be non-rotatably secured on the free end of the stem 14 by riveting over the head 16 thereof.

The retaining member 15 comprises a rectangular plate of spring metal, as shown in Fig. 3. The bordering edges of the sheet metal member are substantially straight, or tending slightly to concave, so as to provide relatively sharp and well-defined corners 17. Said member is attached to the stem 14 at the center thereof and is of such size that a circle concentric with the stem 14 and of slightly larger diameter than the annular opening 12 will pass through the corners 17. Thus, upon the member 15 being forced into the annular opening 12, the corners 17 will engage the inner surface of the annular wall 13, centering the stem 14 with respect thereto and causing the member 15 to bend, as shown in Fig. 2, by reason of the restricting action of the opening and the pressure exerted in forcing it therein. Thus, while a cross section of the member 15 will remain substantially straight, it will be bent longitudinally and the spring pressure thereof will cause the relatively sharp edges 17 to engage in the inner surface of the wall 13 so as to prevent any turning or rotary movement thereof, as well as outward movement. Thus the device will be firmly locked in position. It will be obvious that any outward movement exerted on the member 15, when in its curved contracted position, will cause a longitudinal expansion, thereby exerting an increased gripping action by the corners.

As shown in the modified form of Fig. 4, in place of the stem 14, the spring locking member 115 is provided with a pair of ears 116 stamped from the center thereof and bent laterally to provide the flanges 117, which may be welded or soldered to the name plate.

The invention claimed is:

1. An interlocking device for fastening two objects together, one of which is provided with an annular recess, comprising a flexible plate, and means for rigidly securing said plate to said first-mentioned object, said plate having a plurality of relatively sharp corners adapted to engage and grip the inner wall of the recess in such manner as to prevent rotation and withdrawal thereof.

2. The combination with two members to be interlocked, one of said members having an opening therein surrounded by an annular wall, of a flexible plate secured to the other member in spaced relation therewith adapted to be inserted in said annular opening, said plate being provided with a plurality of relatively sharp corners, the greatest distance between said corners being slightly greater than the diameter of said opening, whereby said plate will be caused to flex upon being inserted therein and said corners will engage and grip said wall for resisting rotation and outward movement.

3. The combination with two members to be interlocked, one of said members having an opening therein surrounded by an annular wall, of a flexible plate secured to the other member and adapted to be inserted in said annular opening under pressure, said plate being provided with a plurality of relatively sharp corners for engaging the inner surface of said wall and preventing the edges of said plate from engaging therewith, the greatest distance between said corners being slightly greater than the diameter of said opening so as to cause said plate to flex and bulge away from said last-mentioned member upon being forced in said opening, whereby said relatively sharp corners will act to grip said wall and resist any outward movement and rotation of said plate and the member to which it is attached.

4. The combination with two members to be interlocked, one of said members having an annular opening therein surrounded by an annular wall, of a substantially rectangular flexible plate adapted to be inserted in said annular opening, means for rigidly securing said plate at a central portion to the other member, said plate being provided with relatively sharp corners, the diagonal corners thereof being separated a greater distance than the diameter of said opening for causing said plate to flex and bulge away from the member to which it is secured upon being forced into said opening and preventing engagement of the annular wall by any edge thereof, whereby said corners will act to grip said wall under spring tension so as to resist rotation of the plate and lock it against outward movement.

In witness whereof, I have hereunto affixed my signature.

CLARK A. SWINEHART.